United States Patent
Wu et al.

(10) Patent No.: US 7,826,190 B2
(45) Date of Patent: Nov. 2, 2010

(54) OVER-VOLTAGE PROTECTION DEVICE

(75) Inventors: Han-Tung Wu, Nantou (TW);
Yang-Chih Lin, Dali (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 187 days.

(21) Appl. No.: 12/076,457

(22) Filed: Mar. 19, 2008

(65) Prior Publication Data

US 2009/0237850 A1    Sep. 24, 2009

(51) Int. Cl.
*H02H 3/20* (2006.01)

(52) U.S. Cl. .......................... 361/91.1; 361/18; 361/86; 361/111

(58) Field of Classification Search .................... 361/18, 361/54, 56, 86, 91.1, 111
See application file for complete search history.

(56) References Cited

U.S. PATENT DOCUMENTS

| | | | | |
|---|---|---|---|---|
| 5,548,188 A | * | 8/1996 | Lee | ............................ 315/156 |
| 6,816,348 B2 | * | 11/2004 | Chen et al. | ..................... 361/56 |
| 2008/0144242 A1 | * | 6/2008 | Lai | .............................. 361/56 |
| 2008/0186644 A1 | * | 8/2008 | Migliavacca | .................. 361/86 |
| 2008/0266739 A1 | * | 10/2008 | Migliavacca | ................ 361/91.1 |

FOREIGN PATENT DOCUMENTS

JP    2001211058 A  *  8/2001

OTHER PUBLICATIONS

Abstract for JP 2001-211058. Mar. 8, 2001.*
Translation for JP 2001-211058. Mar. 8, 2001.*

* cited by examiner

*Primary Examiner*—Jared J Fureman
*Assistant Examiner*—Christopher J Clark
(74) *Attorney, Agent, or Firm*—Kile Goekjian Reed & McManus PLLC

(57) ABSTRACT

An over-voltage protection device includes a comparison module, a first switch, a second switch and an output switch. The comparison module compares a divided input voltage with a threshold voltage to output a control signal according to the comparison result. The first switch is coupled with the comparison module and controlled by the control signal. The second switch is coupled with the first switch and is controlled by the output signal of the first switch. The output switch is coupled with the second switch, the output switch is coupled with the voltage output terminal, and the output switch is coupled with the voltage input terminal. The output switch is controlled by the output signal of the second switch to cut off the input voltage or pass the input voltage to the voltage output terminal.

7 Claims, 5 Drawing Sheets

OVER-VOLTAGE PROTECTION DEVICE

BACKGROUND OF THE INVENTION

1. Field of the Invention

The present invention relates to an over-voltage protection device. In particular, this invention relates to a circuit device that restrains the spike voltage and protects the over-voltage for a power adapter or a hand-held device.

2. Description of the Related Art

Reference is made to FIG. 1. When an electric equipment 20 (such as a laptop or a LCD etc.) that operates in DC power is providing power from an AC power, a power adapter 21 is required to convert the AC power into DC power. In FIG. 1, power adapter 21 obtains the AC power from an AC power plug 22, and converts the AC power into DC power for electric equipment 20. The structure in FIG. 1 has a problem. When electric equipment 20 is turned on or AC power plug 22 of power adapter 21 is plugged into the AC power socket (not shown in the figure), a large spike voltage easily occurs to generate spike current. The large spike current makes the AC power socket and the switch generate a spark or interfere with other electric equipments. The power quality is affected.

Moreover, when the AC power received by power adapter 21 is unstable (such as when the voltage is too high), power adapter 21 converts the over-voltage into over-voltage DC power, and delivers the over-voltage DC power to electric equipment 20. The over-voltage DC power will burn down electric equipment 20. Therefore, power adapter 20 needs a spike voltage restraining circuit and an over-voltage protection circuit to overcome the above problems.

SUMMARY OF THE INVENTION

One particular aspect of the present invention is to provide an over-voltage protection device that can be used in a power adapter and has the spike voltage restraining function and an over-voltage protection function.

In the first embodiment, the over-voltage protection device has a voltage input terminal and a voltage output terminal. The over-voltage protection device includes a comparison module, a first switch, a second switch and an output switch. The comparison module obtains an input voltage from the voltage input terminal, and compares the input voltage with a threshold voltage and outputs a control signal according to the comparison result. The first control terminal of the first switch is coupled with the comparison module. The first drain terminal is coupled with the voltage input terminal. The first source terminal of the first switch is coupled with a grounding terminal. The first switch is controlled by the control signal. The second control terminal of the second switch is coupled with the first drain terminal. The second source terminal of the second switch is coupled with the grounding terminal. The second switch is controlled by the output signal of the first source terminal. The third control terminal of the output switch is coupled with the second drain terminal. The third drain terminal of the output switch is coupled with the voltage output terminal. The third source terminal of the output switch is coupled with the voltage input terminal. The output switch is controlled by the output signal of the second drain terminal to cut off the input voltage or pass the input voltage to the voltage output terminal.

In the second embodiment, the over-voltage protection device further includes a first spike voltage restraining device and a second spike voltage restraining device. The first spike voltage restraining device is coupled with the voltage input terminal and the second control terminal to turn off the second switch according to a spike voltage. The second spike voltage restraining device is coupled between the third control terminal and the third source terminal to turn off the output switch according to the spike voltage.

When an over-voltage is inputted, the comparison module determines whether the voltage is too high or not, and turns off the output switch to achieve the over-voltage protection if the voltage is too high. At the same time, when the spike voltage occurs, the first spike voltage restraining device guides the spike voltage into the grounding terminal; and the second spike voltage restraining device will short-circuit the control terminal and the source terminal of the output switch in order to cut off the voltage and thus achieve the spike voltage restraining function.

For further understanding of the invention, reference is made to the following detailed description illustrating the embodiments and examples of the invention. The description is for illustrative purpose only and is not intended to limit the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
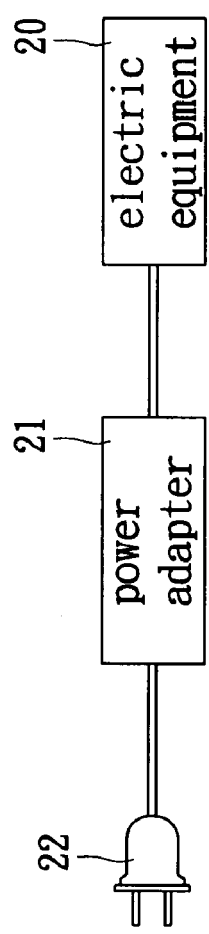
FIG. 1 is a block diagram of the power adapter of the prior art.
Figure 2:
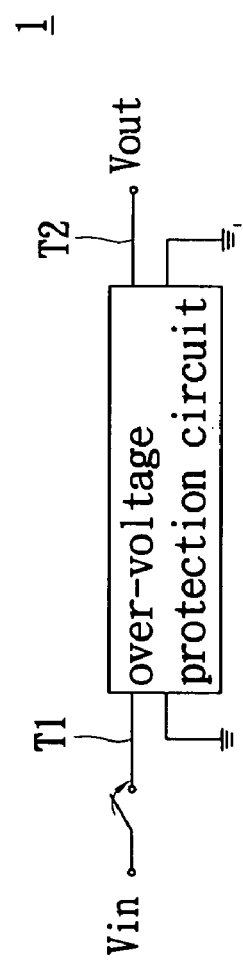
FIG. 2 is a schematic diagram of the over-voltage protection device of the present invention.

Reference is made to FIG. 2, which shows a schematic diagram of the over-voltage protection device of the present invention. The over-voltage protection device 1 has a voltage input terminal T1 and a voltage output terminal T2. The over-voltage protection device 1 obtains an input voltage Vin from the voltage input terminal T1, and outputs an output voltage Vout via the voltage output terminal T2. When the input voltage Vin is inputted into the over-voltage protection device 1 and the input voltage Vin is larger than a predetermined value, the over-voltage protection device 1 will cut off the input voltage Vin. Moreover, when a spike voltage occurs, the over-voltage protection device 1 will also cut off the input voltage Vin.

Figure 3:
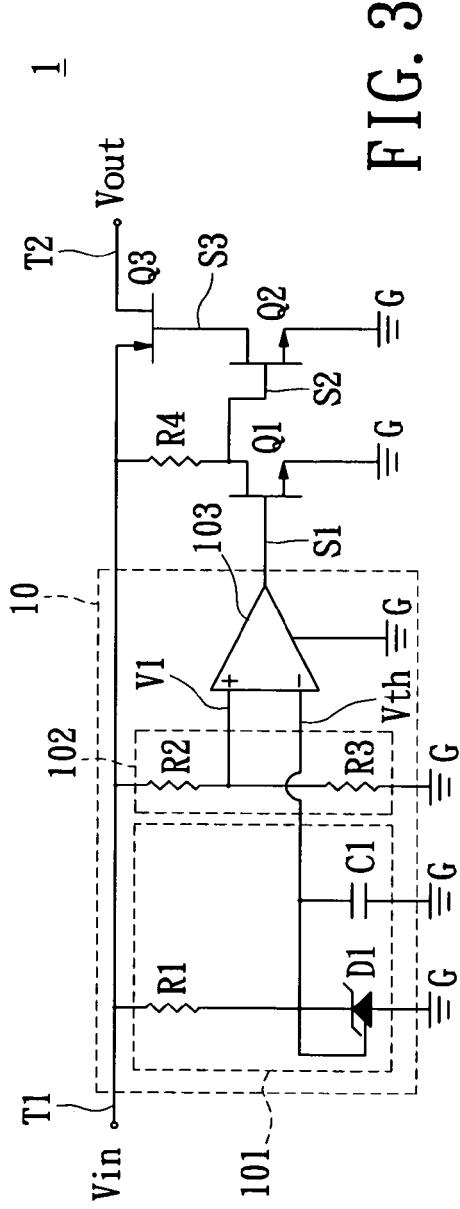
FIG. 3 is a circuit diagram of the over-voltage protection device of the first embodiment of the present invention.

Reference is made to FIGS. 2 and 3. FIG. 3 shows a circuit diagram of the over-voltage protection device of the first embodiment of the present invention. The over-voltage protection device 1 includes a comparison module 10, a first switch Q1, a second switch Q2 and an output switch Q3. The comparison module 10 obtains an input voltage Vin from the voltage input terminal T1, and compares the input voltage Vin with a threshold voltage Vth to output a control signal S1 according to the comparison result. The first control terminal of the first switch Q1 is coupled with the comparison module 10. The first drain terminal of the first switch Q1 is coupled with the voltage input terminal T1. The first source terminal of the first switch Q1 is coupled with a grounding terminal G. The first switch Q1 is controlled by the control signal S1.

Reference is made to FIGS. 2 and 3 again. The second control terminal of the second switch Q2 is coupled with the first drain terminal of the first switch Q1. The second source terminal of the second switch Q2 is coupled with the grounding terminal G. The second switch Q2 is controlled by the output signal S2 of the first source terminal of the first switch Q1. The third control terminal of the output switch Q3 is coupled with the second drain terminal of the second switch Q2. The third drain terminal of the output switch Q3 is coupled with the voltage output terminal T2. The third source terminal of the output switch Q3 is coupled with the voltage input terminal T1. The output switch Q3 is controlled by the output signal S3 of the second drain terminal of the second switch Q2 to cut off the input voltage Vin or pass the input voltage Vin to the voltage output terminal T2.

Reference is made to FIGS. 2 and 3 again. The first switch Q1 is a NMOSFET, the second switch Q2 is a NMOSFET, and the output switch Q3 is a PMOSFET.

Reference is made to FIGS. 2 and 3 again. The comparison module 10 includes a parallel constant voltage regulator 101, a voltage-divide unit 102, and a comparator 103. The parallel constant voltage regulator 101 includes a Zener diode D1, an input capacitor C1 and an input resistor R1. The Zener diode Z1 is coupled with the input resistor R1 in serial and is coupled with the input capacitor C1 in parallel. The parallel constant voltage regulator 101 is coupled with the voltage input terminal T1 to generate the threshold voltage Vth according to the input voltage Vin. The voltage-divide unit 102 is coupled with the voltage input terminal T1 to receive the input voltage Vin and generate a divided input voltage V1. The non-invert input terminal of the comparator 103 receives the divided input voltage Vin, the inverted input terminal of the comparator 103 receives the threshold voltage Vth, and the output terminal of the comparator 103 outputs the control signal S1.

Reference is made to FIGS. 2 and 3 again. The designer can use the different Zener diode D1 with different operation voltage range to obtain the threshold voltage Vth. Furthermore, by designing the resistance of the resistors R2 and R3 in the voltage-divide unit 102, the over-voltage protection range is set. When the input voltage Vin is conducted to into the over-voltage protection device 1, the Zener diode Z1 breaks down to generate a stable threshold voltage Vth. The resistor R3 in the voltage-divide unit 102 generates the divided input voltage V1 according to the input voltage Vin.

Figure 5A:
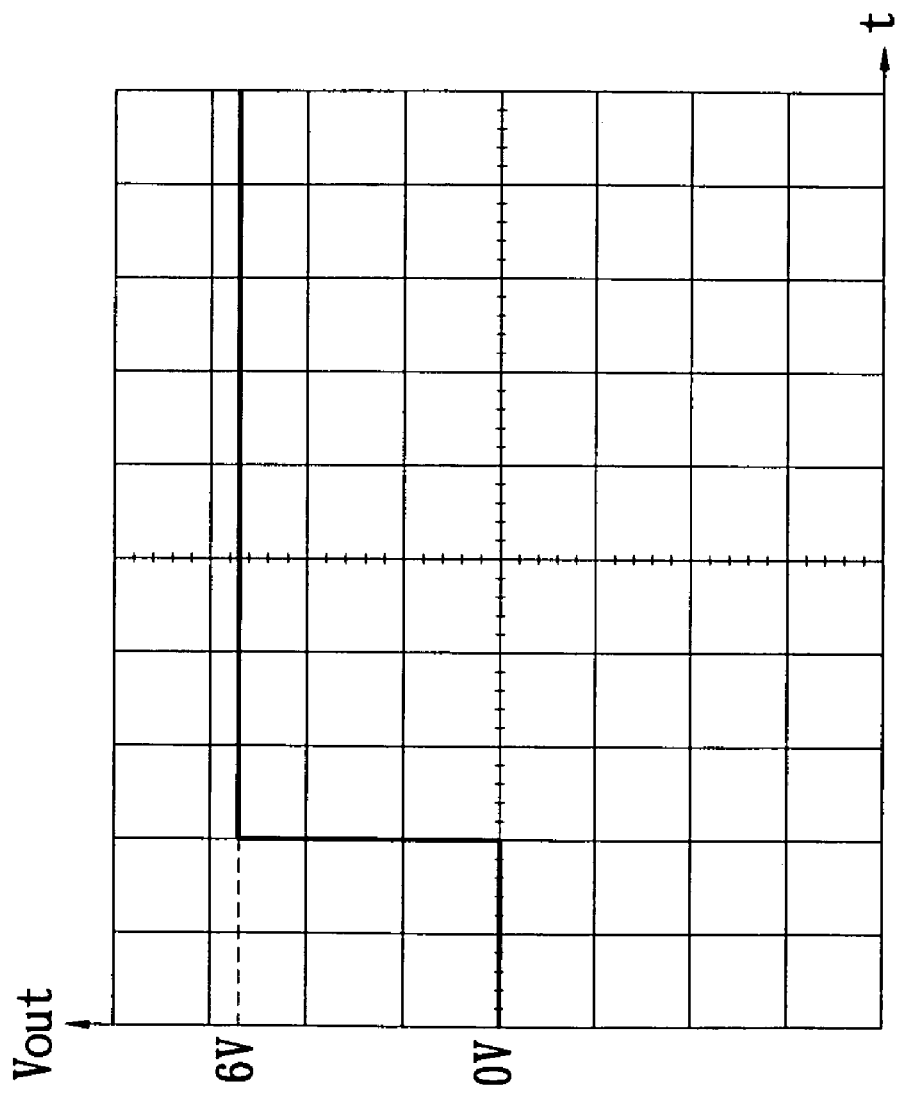
FIG. 5A is a waveform diagram of the output voltage when the over-voltage protection device of the present invention operates under a normal input voltage.

When the input voltage Vin is normal, the divided input voltage V1 is not larger than the threshold voltage Vth. This means that the divided input voltage V1 is lower than the protection voltage range of the over-voltage protection device 1. At this time, the comparator 103 outputs a low level control signal S1 to turn off the first switch Q1. Because the first switch Q1 is in the turn-off status, the input voltage V1 is delivered to the second control terminal of the second switch Q2 via the first resistor R4 to turn on the second switch Q2. The turn-on second switch Q2 guides the third control terminal of the output switch Q3 to the grounding terminal G to turn on the output switch Q3. At this time, the input voltage Vin passes through the turn-on output switch Q3 and outputs from the voltage output terminal T2 of the over-voltage protection device 1 to form the output voltage Vout. Reference is made to FIG. 5A, which shows a waveform diagram of the output voltage Vout when the over-voltage protection device of the present invention operates under a normal input voltage Vin. In FIG. 5A, the output voltage Vout is 6V.

Figure 5B:
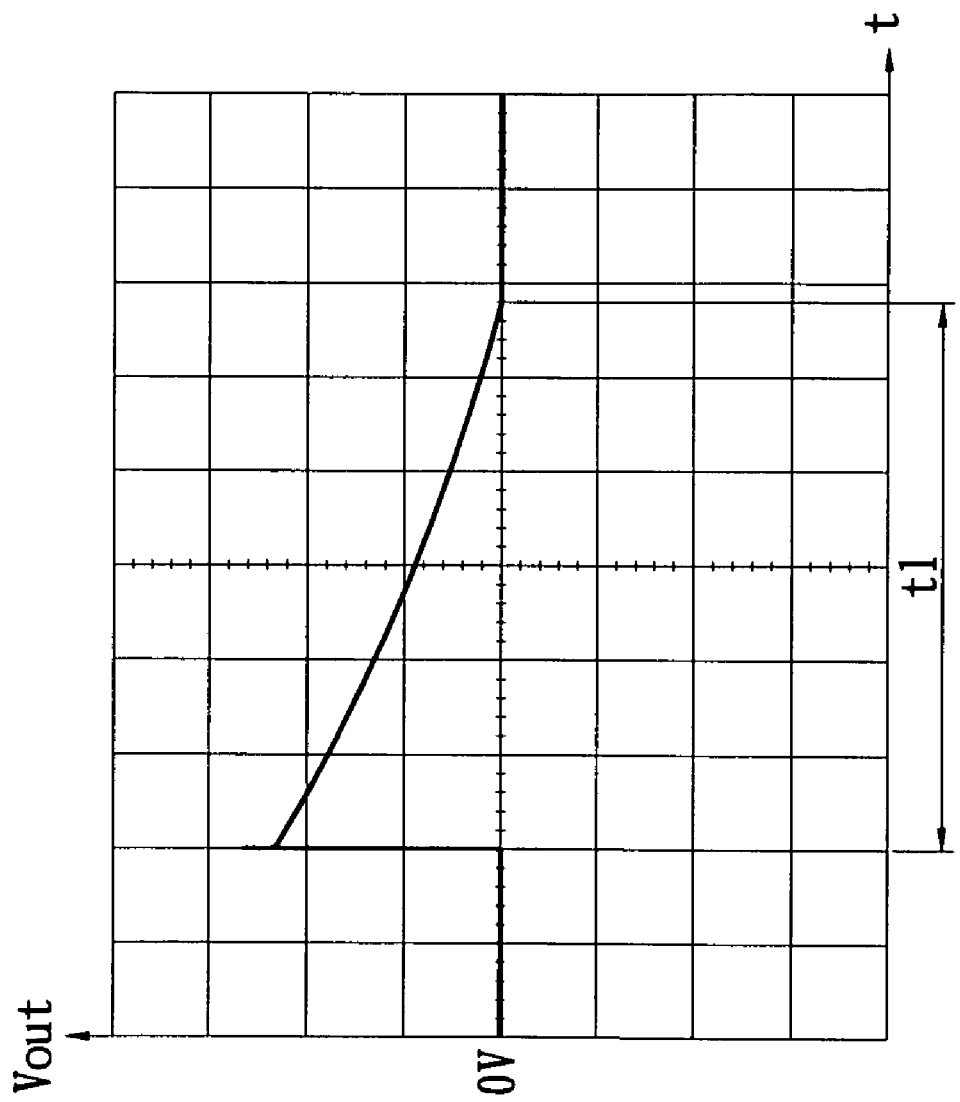
FIG. 5B is a waveform diagram of the output voltage when the over-voltage protection device of the present invention operates under an over-voltage input voltage.

When the input voltage Vin is too high, the divided input voltage V1 is larger than the threshold voltage Vth. This means that the divided input voltage V1 is larger than the protection voltage range of the over-voltage protection device 1. At this time, the comparator 103 outputs a high level control signal S1 to turn on the first switch Q1. The turn-on switch Q1 guides the second control terminal of the second switch Q2 to the grounding terminal G in order to turn off the second switch Q2. The turn-Off second switch Q2 makes the third control terminal of the output switch Q3 to become floating status in order to turn off the output switch Q3. The turn-off output switch Q3 cuts off the input voltage Vin so that the over-voltage input voltage Vin cannot not be delivered to the over-voltage protection device 1. Reference is made to FIG. 5B, which shows a waveform diagram of the output voltage Vout when the over-voltage protection device of the present invention operates under an over-voltage input voltage. In FIG. 5B, after a transient period t1 passes, the output voltage Vout becomes 0V.

Figure 4:
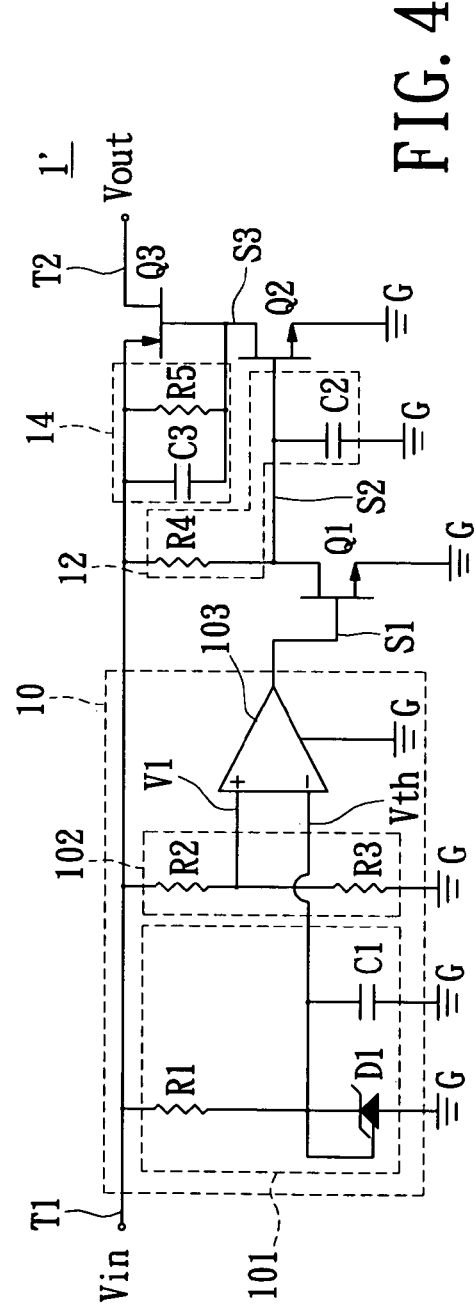
FIG. 4 is a circuit diagram of the over-voltage protection device of the second embodiment of the present invention.

Reference is made to FIGS. 2 and 4. FIG. 4 shows a circuit diagram of the over-voltage protection device of the second embodiment of the present invention. The elements in second embodiment that are the same as ones in the first embodiment are labeled by the same labels. The operation principle and the effect of the second embodiment are the same ones of the first embodiment. The difference is: the over-voltage protection device 1' further includes a first spike voltage restraining device 12 and a second spike voltage restraining device 14. The first spike voltage restraining device 12 is coupled with the voltage input terminal T1 and the second control terminal of the second switch Q2 in order to turn off the second switch Q2 according to a spike voltage. The second spike voltage restraining device 14 is coupled between the third control terminal and the third source terminal of the output switch Q3 in order to turn off the output switch Q3 according to the spike voltage.

Reference is made to FIGS. 2 and 4 again. The first spike voltage restraining device 12 includes a first resistor R4 and a first capacitor C2 that are coupled together in serial. The first terminal of the first resistor R4 is coupled with the input voltage terminal T1. The second terminal of the first resistor R4 is coupled with the first drain terminal of the first switch Q1, the second control terminal of the second switch Q2, and the first terminal of the first capacitor C2. The second terminal of the first capacitor C2 is coupled with the grounding terminal G. The second spike voltage restraining device 14 includes a second resistor R5 and a second capacitor C3 that are coupled together in parallel. The first terminal of the second capacitor C3 is coupled with the input voltage terminal. The second terminal of the second capacitor C3 is coupled with the second drain terminal of the second switch Q2, and the third control terminal of the output switch Q3.

Reference is made to FIGS. 2 and 4 again. The spike voltage is a high frequency AC noise. According to formula (1), when the spike voltage occurs, first capacitor C2 and second capacitor C3 form a short circuit status (the impedance is equal to zero) due to the high frequency AC spike voltage.

$$Xc = -j\frac{1}{\omega c} \quad (1)$$

In formula (1), Xc is the impedance of the capacitor, ω is the frequency, and the C is the capacitance of the capacitor. When a high frequency AC noise occurs, the impedance Xc of the capacitor is equal to 0. Therefore, the capacitor is short circuited.

Figure 5C:
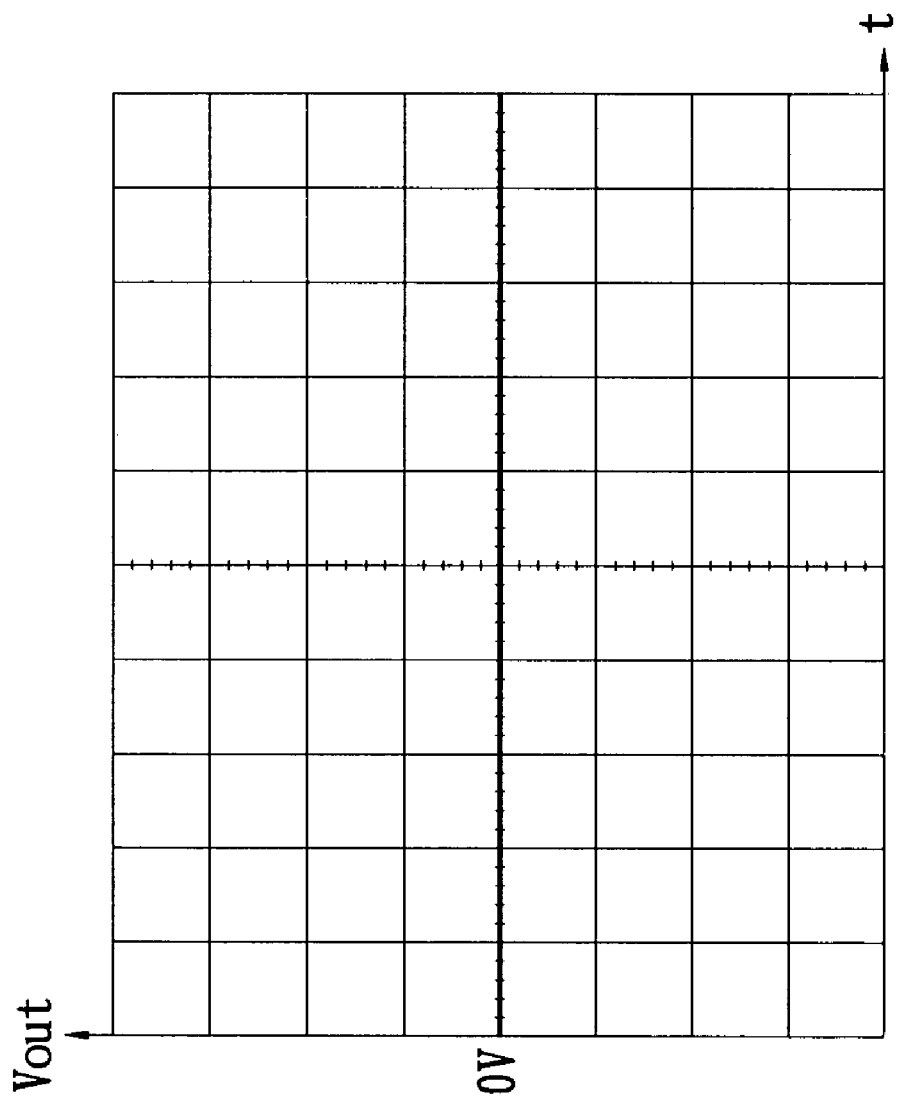
FIG. 5C is a waveform diagram of the output voltage when the over-voltage protection device of the present invention operates under a spike voltage.

According to formula (1), when the spike voltage occurs, the first capacitor C2 of the first spike voltage restraining device 12 becomes short circuited to guide the spike voltage to the grounding terminal G. At this time, the short circuited first capacitor C2 is connected between the second control terminal and the second source terminal of the second switch Q2 in order to turn off the second switch Q2. The turn-off second switch Q2 makes the third control terminal of the output switch Q3 to become floating status in order to turn off the output switch Q3. Moreover, when the spike voltage occurs, the second capacitor C3 of the second spike voltage restraining device 14 also becomes short-circuited. The short circuited second capacitor C3 is connected between the third control terminal and the third source terminal of the third switch Q3 in order to turn off the output switch Q3. The turn-off output switch Q3 cuts off the input voltage Vin so that the input voltage Vin cannot be delivered to the over-voltage protection device 1. Reference is made to FIG. 5C, which shows a waveform diagram of the output voltage when the over-voltage protection device of the present invention operates under spike voltage. In FIG. 5C, when the spike voltage occurs, the output voltage is 0V.

Reference is made to FIG. 4 again. The second switch Q2, the output switch Q3 and the second spike voltage restraining device 14 form a standard soft-start circuit. When the spike current occurs, the spike current charges the second capacitor C3 in the soft-start circuit so that the current flowing through the output switch Q3 is not too sharp. Thereby, the spike current protection effect is achieved.

The over-voltage protection device of the present invention has a spike voltage retaining function and an over-voltage protection function. When an over-voltage is inputted, the comparison module determines if the voltage is too high and turns off the output switch to achieve the over-voltage protection function if the voltage is too high. At the same time, when the spike voltage occurs, the first spike voltage restraining device guides the spike voltage into the grounding terminal. The second spike voltage restraining device short circuits the control terminal and the source terminal of the output switch in order to cut off the voltage to achieve the spike voltage restraining function.

The description above only illustrates specific embodiments and examples of the invention. The invention should therefore cover various modifications and variations made by herein-described structure and operations of present invention, provided that they fall within the scope of the invention as defined in the following appended claims.

What is claimed is:

1. An over-voltage protection device, having a voltage input terminal and a voltage output terminal, comprising:

a comparison module, wherein the comparison module obtains an input voltage from the voltage input terminal, and compares the input voltage with a threshold voltage and outputs a control signal according to a comparison result, wherein said comparison module includes:

a parallel constant voltage regulator coupled to the voltage input terminal for generating the threshold voltage corresponding to the input voltage, wherein the parallel constant voltage regulator comprises a Zener diode, an input capacitor in a parallel connection with the Zener diode, and an input resistor in a serial connection with the Zener diode, a voltage-divide unit coupled to the voltage input terminal for receiving the input voltage and generating a divided input voltage, and a comparator having a non-inverted input terminal, an inverted input terminal, and an output terminal, wherein the non-inverted input terminal of the comparator is configured to receive the divided input voltage from said voltage-divide unit, the inverted input terminal of the comparator is configured to receive the threshold voltage from said parallel constant voltage regulator, and the output terminal of the comparator is configured to output the control signal;

a first switch, wherein a first control terminal of the first switch is coupled with the comparison module, a first drain terminal of the first switch is coupled with the voltage input terminal, a first source terminal of the first switch is coupled with a grounding terminal, and the first switch is controlled by the control signal;

a second switch, wherein a second control terminal of the second switch is coupled with the first drain terminal, a second source terminal of the second switch is coupled with the grounding terminal, and the second switch is controlled by an output signal of the first source terminal;

an output switch, wherein a third control terminal of the output switch is coupled with the second drain terminal, a third drain terminal of the output switch is coupled with the voltage output terminal, a third source terminal of the output switch is coupled with the voltage input terminal, and the output switch is controlled by an output signal of the second drain terminal to cut off the input voltage or pass the input voltage to the voltage output terminal;

a first spike voltage restraining device, wherein the first spike voltage restraining device is coupled with the voltage input terminal and the second control terminal to turn off the second switch according to a spike voltage; and a second spike voltage restraining device, wherein the second spike voltage restraining device is coupled between the third control terminal and the third source terminal to turn off the output switch according to the spike voltage.

2. The over-voltage protection device as claimed in claim 1, wherein the first spike voltage restraining device comprises a first resistor coupled with a first capacitor C2 in serial, a first terminal of the first resistor is coupled with the input voltage terminal, a second terminal of the first resistor is coupled with the first drain terminal of the first switch, the second control terminal of the second switch and a first terminal of the first capacitor, and a second terminal of the first capacitor is coupled with the grounding terminal.

3. The over-voltage protection device as claimed in claim 1, wherein the second spike voltage restraining device comprises a second resistor coupled with a second capacitor in parallel, a first terminal of the second capacitor is coupled with the input voltage terminal, and a second terminal of the second capacitor is coupled with the second drain terminal of the second switch and the third control terminal of the output switch.

4. The over-voltage protection device as claimed in claim 1, wherein the first switch is a NMOSFET.

5. The over-voltage protection device as claimed in claim 1, wherein the second switch is a NMOSFET.

6. The over-voltage protection device as claimed in claim 1, wherein the output switch is a PMOSFET.

7. The over-voltage protection device as claimed in claim 1, wherein the second switch, the output switch and the second spike voltage restraining device form a standard soft-start circuit.

* * * * *